(12) United States Patent
DeLaurier et al.

(10) Patent No.: US 11,488,350 B2
(45) Date of Patent: Nov. 1, 2022

(54) COMPRESSION TECHNIQUES AND HIERARCHICAL CACHING

(71) Applicant: Apple Inc., Cupertino, CA (US)

(72) Inventors: Anthony P. DeLaurier, Los Altos, CA (US); Karl D. Mann, Geneva, FL (US); Tyson J. Bergland, Sunnyvale, CA (US); Winnie W. Yeung, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/338,846

(22) Filed: Jun. 4, 2021

(65) Prior Publication Data

US 2021/0295593 A1 Sep. 23, 2021

Related U.S. Application Data

(63) Continuation of application No. 16/673,883, filed on Nov. 4, 2019, now Pat. No. 11,062,507.

(51) Int. Cl.
*G06T 15/80* (2011.01)
*G06T 15/00* (2011.01)
*G06T 15/04* (2011.01)
*G09G 5/36* (2006.01)

(52) U.S. Cl.
CPC ............ *G06T 15/80* (2013.01); *G06T 15/005* (2013.01); *G06T 15/04* (2013.01); *G09G 5/363* (2013.01)

(58) Field of Classification Search
None
See application file for complete search history.

(56) References Cited

U.S. PATENT DOCUMENTS

| | | |
|---|---|---|
| 6,919,904 B1 | 7/2005 | Kilgariff |
| 8,928,681 B1 | 1/2015 | Edmondson et al. |
| 9,734,548 B2 | 8/2017 | Hakura et al. |
| 2005/0071579 A1 | 3/2005 | Luick |

(Continued)

FOREIGN PATENT DOCUMENTS

WO 2018/057109 A 3/2018

OTHER PUBLICATIONS

International Preliminary Report on Patentability in PCT Appl. No. PCT/US2020/053679 dated May 19, 2022, 9 pages.

(Continued)

*Primary Examiner* — Jennifer Mehmood
*Assistant Examiner* — Jed-Justin Imperial
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to compression of data stored at different cache levels. In some embodiments, a memory system implements a storage hierarchy that includes first cache circuitry and second cache circuitry at different levels of the hierarchy. Processor circuitry generates write data to be written to the memory system. In some embodiments, first compression circuitry is configured to compress a first block of write data in response to full accumulation of the first block in the first cache circuitry and second compression circuitry is configured to compress a second block of write data in response to full accumulation of the second block in the second cache circuitry. Write circuitry may write the first and second compressed blocks of data in a single combined write to a higher level in the storage hierarchy.

20 Claims, 8 Drawing Sheets

(56) References Cited

U.S. PATENT DOCUMENTS

| | | |
|---|---|---|
| 2007/0146380 A1 | 6/2007 | Nystad |
| 2015/0331619 A1 | 11/2015 | Zheng |
| 2017/0278215 A1 | 9/2017 | Appu et al. |
| 2018/0075574 A1 | 3/2018 | Brennan et al. |
| 2018/0075584 A1 | 3/2018 | Akenine-Moller |
| 2019/0206090 A1 | 7/2019 | Ray |
| 2019/0354482 A1 | 11/2019 | Lee |
| 2020/0210343 A1 | 7/2020 | Tomei |
| 2020/0372603 A1 | 11/2020 | Rangan |

OTHER PUBLICATIONS

Jelena Trajkovic et al, "Improving SDRAM access energy efficiency for low-power embedded systems," ACM Transactions On Embedded Computing Systems, ACM, New York, NY, US, vol. 7, No. 3, May 8, 2008 (May 8, 2008), pp. 1-21, XP058099898, ISSN: 1539-9087, DOI: 10.1145/1347375.1347377.

COMPRESSION TECHNIQUES AND HIERARCHICAL CACHING

PRIORITY CLAIM

The present application is a continuation of U.S. application Ser. No. 16/673,883, filed Nov. 4, 2019, which is incorporated by reference herein in its entirety.

BACKGROUND

Technical Field

This disclosure relates generally to graphics processor architecture and more particularly to circuitry configured to compress pixel write data generated by compute tasks.

Description of the Related Art

Computing devices may compress various types of data, e.g., to reduce memory footprint or bandwidth. Certain types of tasks such as graphics pixel shaders may write data in convenient blocks for compressing. Other types of tasks, such as compute kernels, may generate more arbitrary writes. Compute kernels may perform image processing for various purposes, e.g., for post-processing in computer gaming or for computational photography.

Figure 1A:
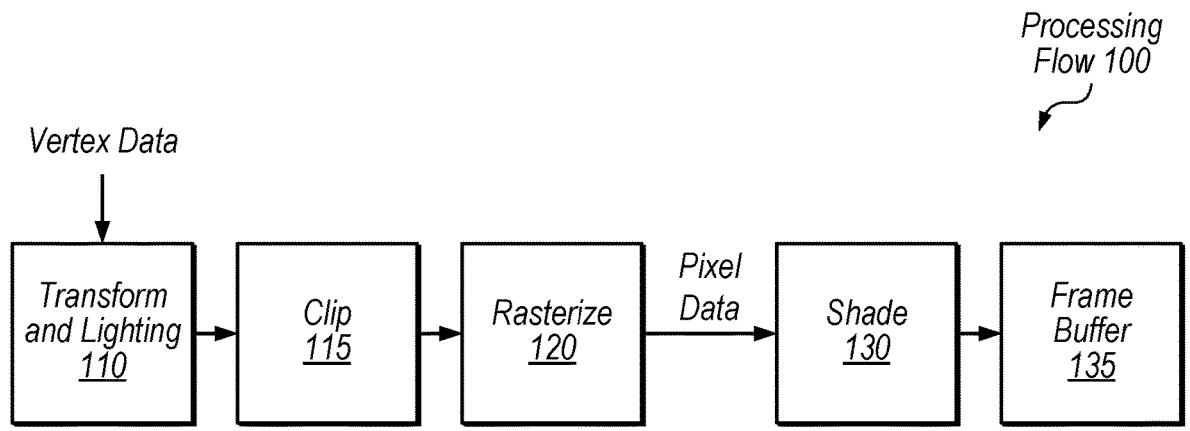
FIG. 1A is a diagram illustrating an overview of example graphics processing operations, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "compression circuit configured to compress a block of pixel data" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Graphics Processing Overview

Referring to FIG. 1A, a flow diagram illustrating an example processing flow 100 for processing graphics data is shown. In some embodiments, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the example elements of FIG. 1A may be performed in various orders, performed in parallel, or omitted. Additional processing steps may also be implemented.

Figure 1B:
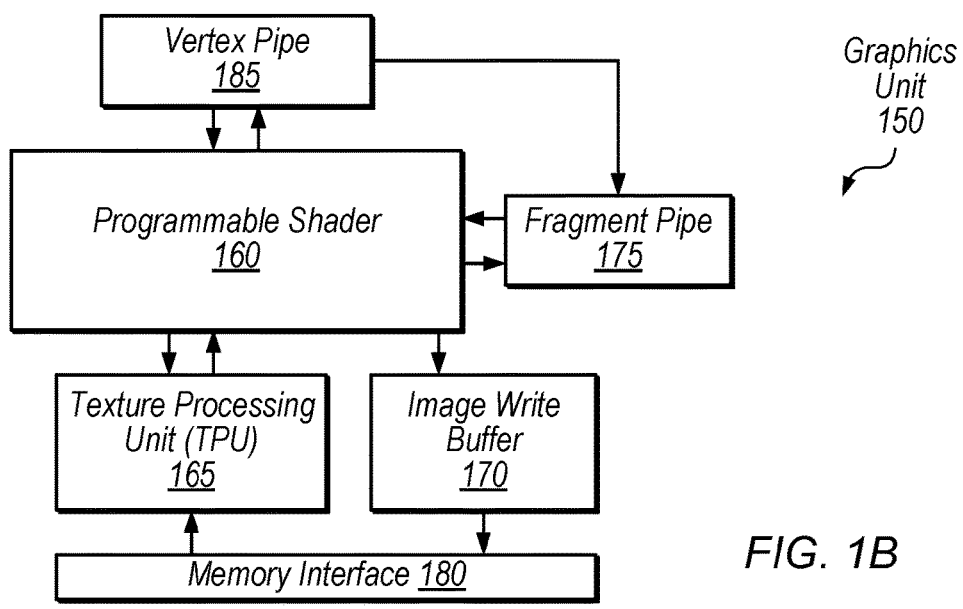
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution pipelines for processing data in parallel, e.g., in a single-instruction multiple-data (SIMD) fashion.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately before being combined into a frame. Memory interface 180 may facilitate communications with one or more of various memory hierarchies in various embodiments.

Overview of Compression at Multiple Cache Levels

Figure 2:
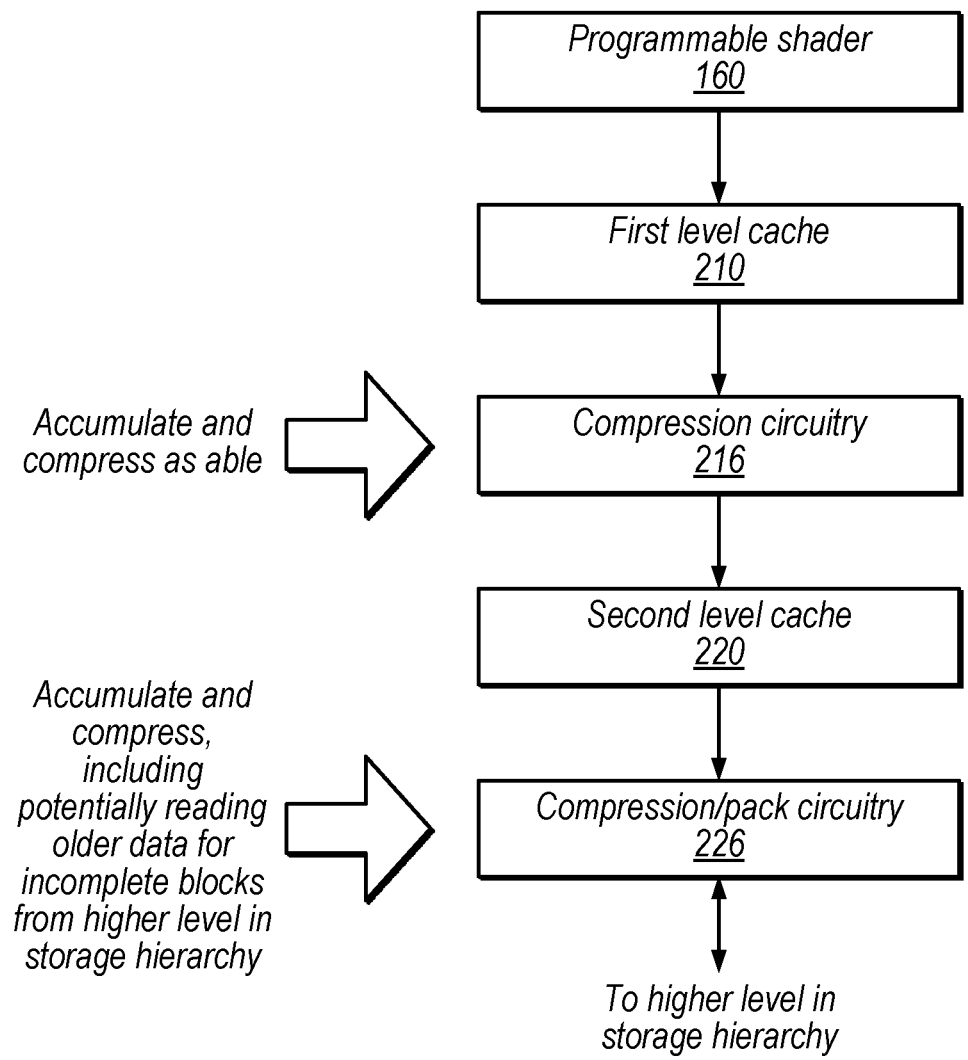
FIG. 2 is a block diagram illustrating circuitry with multiple levels of compression corresponding to caches at different levels in a storage hierarchy, according to some embodiments.

FIG. 2 is a block diagram illustrating circuitry with multiple levels of compression corresponding to caches at different levels in a storage hierarchy, according to some embodiments. In the illustrated embodiment, a graphics processor includes programmable shader 160, first level cache 210, control circuitry 214, compression circuitry 216, second level cache 220, and compression/pack circuitry 226.

Programmable shader 160 may execute compute tasks that write pixel data. This pixel data may be written arbitrarily according to instructions of a compute kernel such that it is unknown when a block of consecutively-addressed pixel writes will be available for compression. In some embodiments, the device is configured to accumulate and compress opportunistically based on data stored in first level cache 210 and also configured to compress based on data stored in second level cache 220. In embodiments where second level cache 220 is larger than first level cache 210, the higher level may be more likely to fully accumulate blocks for compression. Although various examples are discussed herein in the context of compute tasks, similar techniques may be used for various types of graphics work, including pixel shaders with arbitrary pixel writes, for example.

First level cache 210 and second level cache 220 may be implemented using any of various caching technologies, and may or may not share characteristics such as associativity, write-though or write-back implementation, storage circuit technology, tag size, etc. As discussed above, in some embodiments the second level cache 220 is configured to store a greater amount of data than first level cache 210. In some embodiments, second level cache 220 is a shared cache (e.g., among multiple programmable shaders, a texture processing unit, image write buffer, etc.).

Compression circuitry 216 and compression/pack circuitry 226, in some embodiments, are configured to compress blocks of data. In some embodiments, compression circuitry is configured to operate on data blocks of one or more sizes. For example, compression circuitry 216 may be configured to operate on 64, 128, or 256 bytes of data, in various embodiments. Depending on the precision used for pixel data, this may correspond to pixel write data for sets of 4×4, 8×4, or 8×8, pixels, for example.

Circuitry 216 and 226 may use the same compression algorithm or different compression algorithms. In some embodiments, compression circuitry may use multiple predictors in parallel and pick the best predictor to encode a given block. In some embodiments, compression circuitry 216 is configured to compress any blocks that are fully accumulated in first level cache 210 before writing compressed blocks to second level cache 220. A data block or data structure is "fully accumulated" in a storage element when all data elements of that block or structure are stored in that storage element. For example, for an 8×4 block of pixel data, the block is fully accumulated when pixel data for all thirty-two pixels is stored, but not fully accumulated if data for one or more pixels is not stored. Compression may still be performed on a data block that is not fully accumulated (e.g., by filling in default values for missing data in a block), but in some embodiments such filling is delayed until compression/pack circuitry 226 in order to determine if any older writes should be combined with the data block.

If compression circuitry 216 does not fully accumulate a block before it needs to be evicted from first level cache 210, it may store the evicted portion of the block in second level cache 220 without compression. Therefore, in some embodiments, compression circuitry 216 may send metadata to second level cache 220 indicating the status (e.g., compressed or not) of blocks of data. Metadata may also indicate whether data blocks are fully accumulated at one or more cache levels.

Compression/pack circuitry 226, in some embodiments, is configured to pack compressed blocks into a macro-block for a combined write to a higher level in the storage hierarchy. In some embodiments, a macro-block includes multiple blocks, e.g., 8 or 32 blocks. In some embodiments, the macro-block size is smaller than or equal to the number of pixels processed by a graphics workgroup (e.g., the size of a thread group times the number of pixels per thread). In some embodiments, the size of a macro-block corresponds to the size of a cache line in the second level cache 220.

If some blocks of a macro-block are not compressed but can be fully accumulated in second level cache 220, circuitry 226 may compress those blocks. If a macro-block needs to be written to memory but some of its blocks are not fully accumulated, circuitry 216 may read older data from memory for incomplete blocks and attempt to fully accumulate the blocks for compression. A more detailed discussion of such techniques is included below with reference to FIG. 5.

Figure 3:
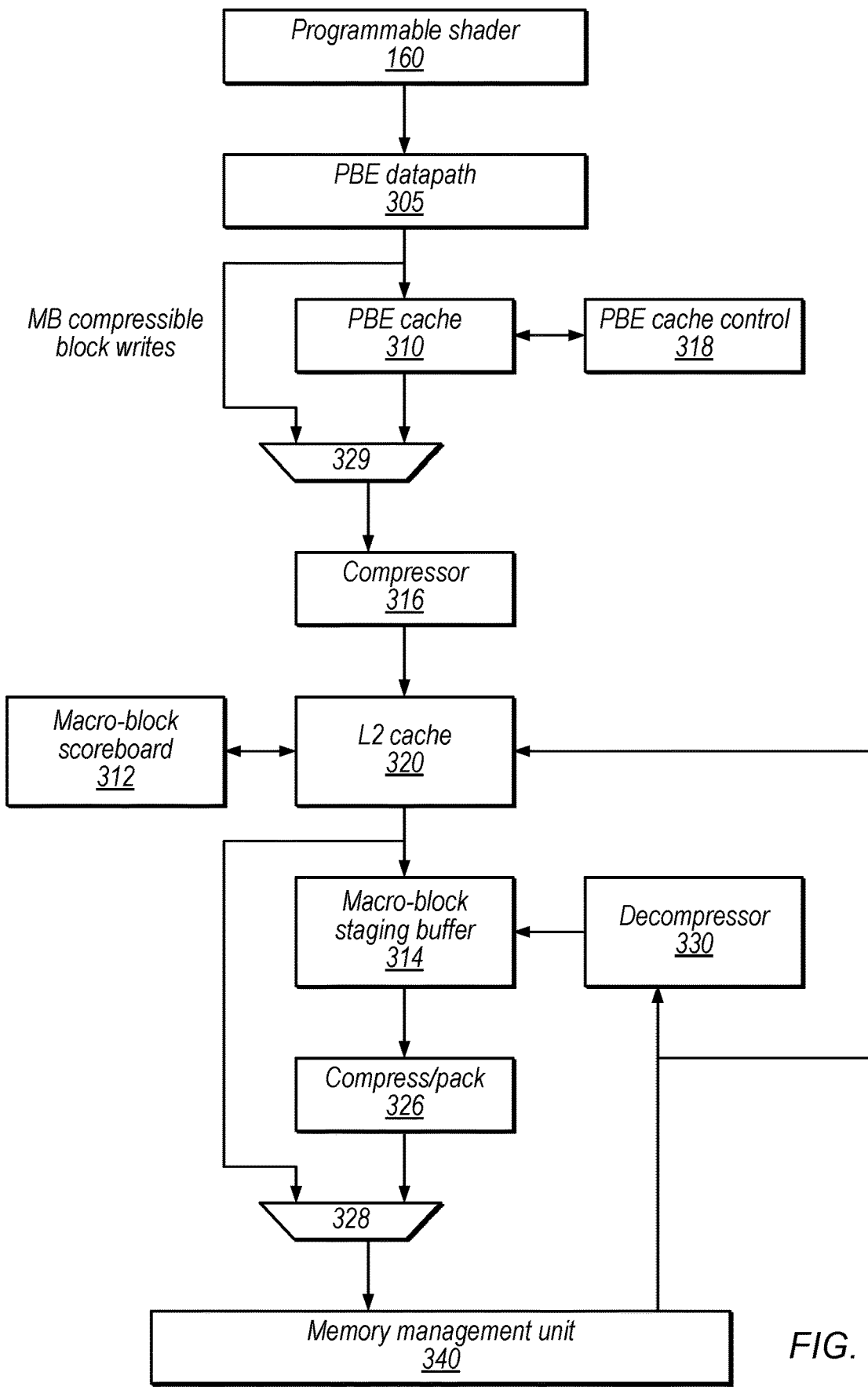
FIG. 3 is a more detailed block diagram illustrating circuitry with multiple levels of compression, according to some embodiments.

FIG. 3 is a more detailed block diagram illustrating circuitry with multiple levels of compression, according to some embodiments. In the illustrated embodiment, a graphics processor includes programmable shader 160, pixel back end (PBE) datapath 305, PBE cache 310, PBE cache control circuitry 318, multiplexers 329 and 328, compressor 316, L2 cache 320, macro-block scoreboard 312, macro-block staging buffer 314, decompressor 330, compress/pack circuitry 326, and memory management unit (MMU) 340.

Note that PBE circuitry 305, 310, and 318 may be included in an example implementation of the image write buffer unit 170 of FIG. 1 and PBE cache 310 is one example of the first level cache 210 of FIG. 2. Similarly, L2 cache 320 is one example of the second level cache 220 of FIG. 2. In the specific example of FIG. 3, L2 cache 320 is configured to load and store data to and from a memory via memory management unit 340.

PBE datapath 305, in the illustrated embodiment, is configured to receive pixel writes from programmable shader 160 and may perform one or more operations on received pixel data. In the illustrated embodiment, PBE datapath 305 is configured to send data for macro-block (MB) compressible writes to MUX 329 and bypass the PBE cache. These types of writes may have full accumulation for each block in a macro-block. Programmable shader 160 may include information with writes indicating whether they are macro-block compressible. Compressor 316 may compress each block within a MB compressible write and store the data in L2 cache 320 (or alternatively may compress the macro-block as a whole, in some embodiments). In the illustrated embodiment, PBE datapath 305 is configured to store data for non-MB-compressible writes in PBE cache 310. PBE cache control 318, in some embodiments, is configured to control various functionality of PBE cache 310, including allocation, eviction, maintaining cache metadata such as least-recently-used information, etc.

Compressor 316, in the illustrated embodiment, is configured to receive data from PBE cache 310 (e.g., evicted data) and compress fully accumulated blocks of the pixel data. Compressor 316, in the illustrated embodiment, is configured to store blocks (whether compressed or not) in L2 cache 320, along with metadata indicating the status of stored blocks. Note that metadata may be stored together in one or more cache lines of L2 cache 320 to reduce interference with the operation of L2 cache 320. In some embodiments, a separate hardware metadata buffer may be implemented in order to accumulate metadata for combined writes. For blocks that are not fully accumulated, compressor 316 may not compress those blocks but may store them in uncompressed form in L2 cache 320.

Macro-block scoreboard 312, in some embodiments, is configured to track the fullness and locations of macro-blocks within L2 cache 320. The scoreboard entries may track validity, macro-block base address, compression format, macro-block size, packed format, metadata address for the macro-block, number of pixels needed for a macro-block to be complete, sub-block state information, timeout status, etc. Macro-block scoreboard 312 may evict macro-blocks in response to detecting full accumulation. In some embodiments, macro-block scoreboard 312 is configured to evict partially-covered macro-blocks after a time-out interval (which may reduce eviction of macro-blocks needed for a cache flush invalidate, for example, because timed-out macro-blocks will have already been evicted). In some embodiments, to evict a macro-block, macro-block scoreboard 312 is configured to send an evict command for each cache line in the macro-block to L2 cache 320, which sends the evicted lines to macro-block staging buffer 314 and marks the evicted line as clean and invalid.

Macro-block staging buffer 314, in some embodiments, is configured to receive blocks from L2 cache 320 and send blocks to compress/pack circuitry 326. In some embodiments, buffer 314 sends one block of a macro-block at a time, in order.

Compress/pack circuitry 326 may compress uncompressed blocks, pack compressed blocks, and send the blocks to memory management unit 340 for a combined write to memory. Note that packing may include adjusting the addresses of compressed blocks after compression, given their reduced size, for a combined write of blocks in the macro-block. In some embodiments, compress circuitry 326 and compressor 316 implement different compression algorithms.

Figure 5:
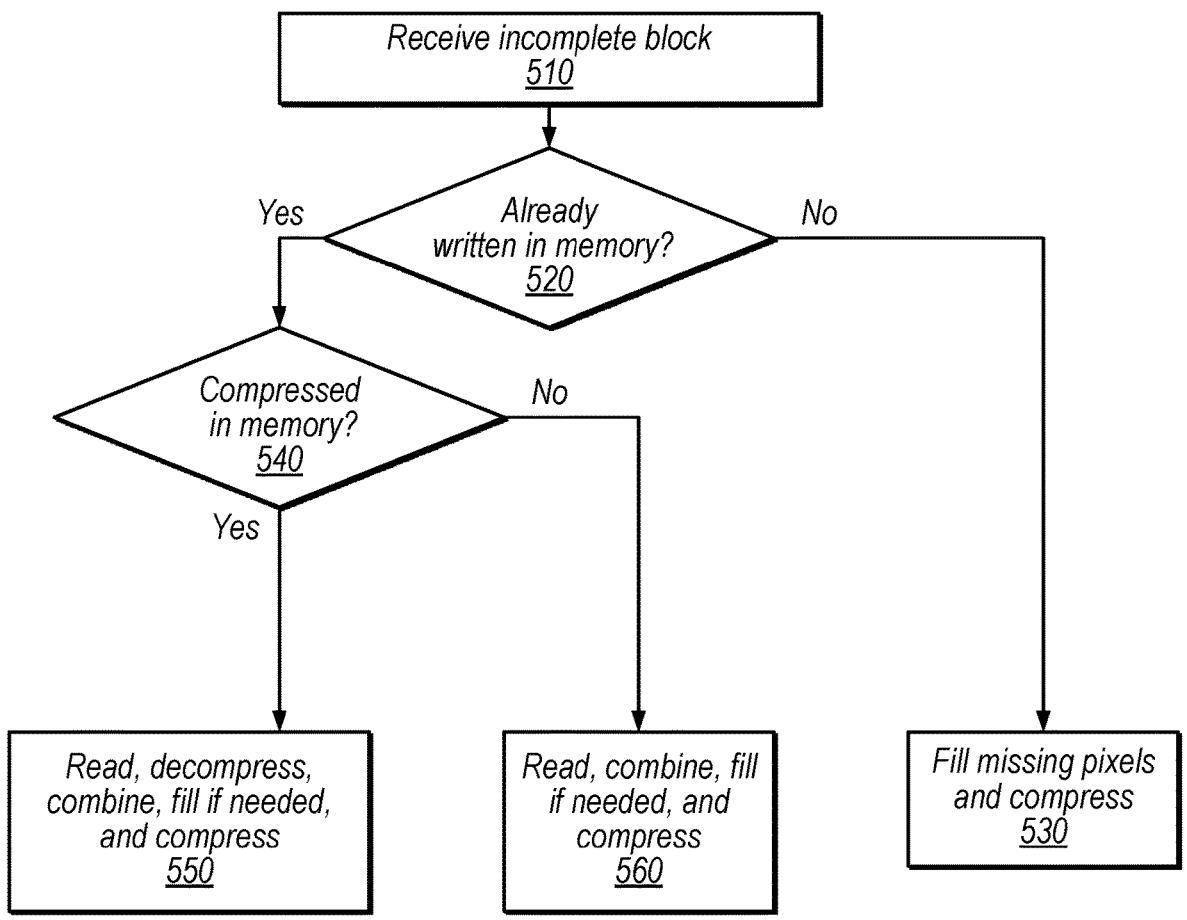
FIG. 5 is a flow diagram illustrating an example method for handling incomplete blocks before writing to memory, according to some embodiments.

For blocks that are not fully accumulated, macro-block staging buffer 314 may check for older write data in memory via memory management unit 340. Decompressor 330 may decompress reads of older data from memory (if compressed) and macro-block staging buffer 314 may attempt to combine the old write data from memory with the new block. If the combination provides full accumulation, compress circuitry 326 may compress the block normally. If the combination does not provide full accumulation, the device may fill remaining portions of the block prior to compression. FIG. 5, discussed below, provides a detailed example technique for handling blocks that are not fully accumulated in macro-block staging buffer 314. Note that metadata associated with the blocks in a macro-block may also be stored from L2 cache 320 into memory along with the macro-block.

As shown, L2 cache 320 may bypass the staging buffer 314 and compress/pack circuitry 326 via MUX 328, e.g., for macro-block compressible writes or for non-compressed writes. In some embodiments, the device is configured to turn off compute compression during one or more processing intervals, e.g., such that pixel writes from compute kernels are not compressed and circuitry 316 and 326 is disabled.

Figure 4:
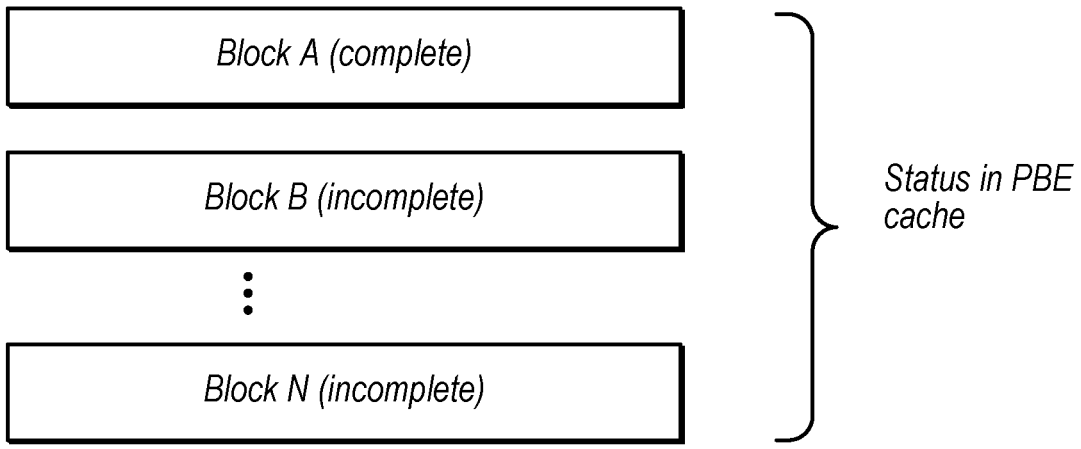
FIG. 4 is a diagram illustrating example status of blocks of pixel write data within a macro-block at different processing stages, according to some embodiments.
Figure 4:
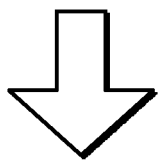
Figure 4:
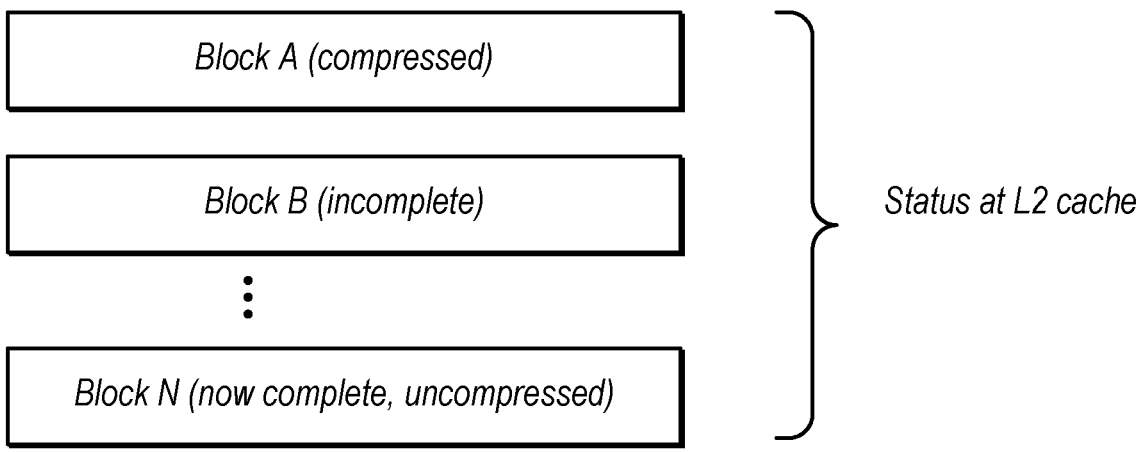

FIG. 4 is a diagram illustrating example blocks at various stages of processing, according to some embodiments. In the illustrated embodiment, the status of blocks A-N are shown when those blocks are in the PBE cache and in the L2 cache of FIG. 3, respectively.

Block A, in the illustrated example, is complete in the PBE cache. Therefore, upon eviction, compressor 316 compresses block A before it is stored in the L2 cache. Block B, in the illustrated example, is incomplete in the PBE cache and therefore there is no compressed when stored in the L2 cache. In the illustrated example, block B remains incomplete in the L2 cache, and may be handled according to FIG. 5 (discussed below) upon eviction from the L2 cache. Block C, in the illustrated example, is incomplete in the PBE cache and therefore is not compressed by compressor 316, but is complete when stored in the L2 cache. Speaking generally, the greater size of the L2 cache may allow for full accumulation of blocks that were not fully accumulated in the smaller PBE cache. In various embodiments, the opportunistic multi-level compression techniques disclosed herein may advantageously improve compression ratios, reduce power consumption, improve performance, etc. relative to traditional compression techniques.

FIG. 5 is a flow diagram illustrating an example method for handling blocks that are not fully accumulated, according to some embodiments. In some embodiments, the techniques of FIG. 5 are relevant for the cache level corresponding to the last level of compression available before storage in a memory (e.g., L2 cache 320 and compression circuitry 326 of FIG. 3).

At 510, in the illustrated embodiment, macro-block staging buffer 314 receives an incomplete block that has been evicted from L2 cache 320. At 520, the device determines whether the incomplete block has already been written in memory. If not, flow proceeds to 530 and the device fills missing pixels (e.g., with default value(s), with value(s) based on other pixels that are accumulated in the block such as color values from the first accumulated pixel in the block, etc.).

If the block has previously been written to memory, flow proceeds to 540 and the device determines if the block was compressed in memory. This determination may be based on metadata previously generated for the block, which may be cached or stored in the memory and associated with the block. If not compressed, the device reads the block at 560, combines the data from memory with the data in the macro-block staging buffer 314, fills any missing pixels, and compresses the block. If compressed, the device reads the block at 550, decompresses the block using decompressor 330, combines the data from memory with the data in the macro-block staging buffer 314, fills any missing pixels, and compresses the block.

Example Method

Figure 6:
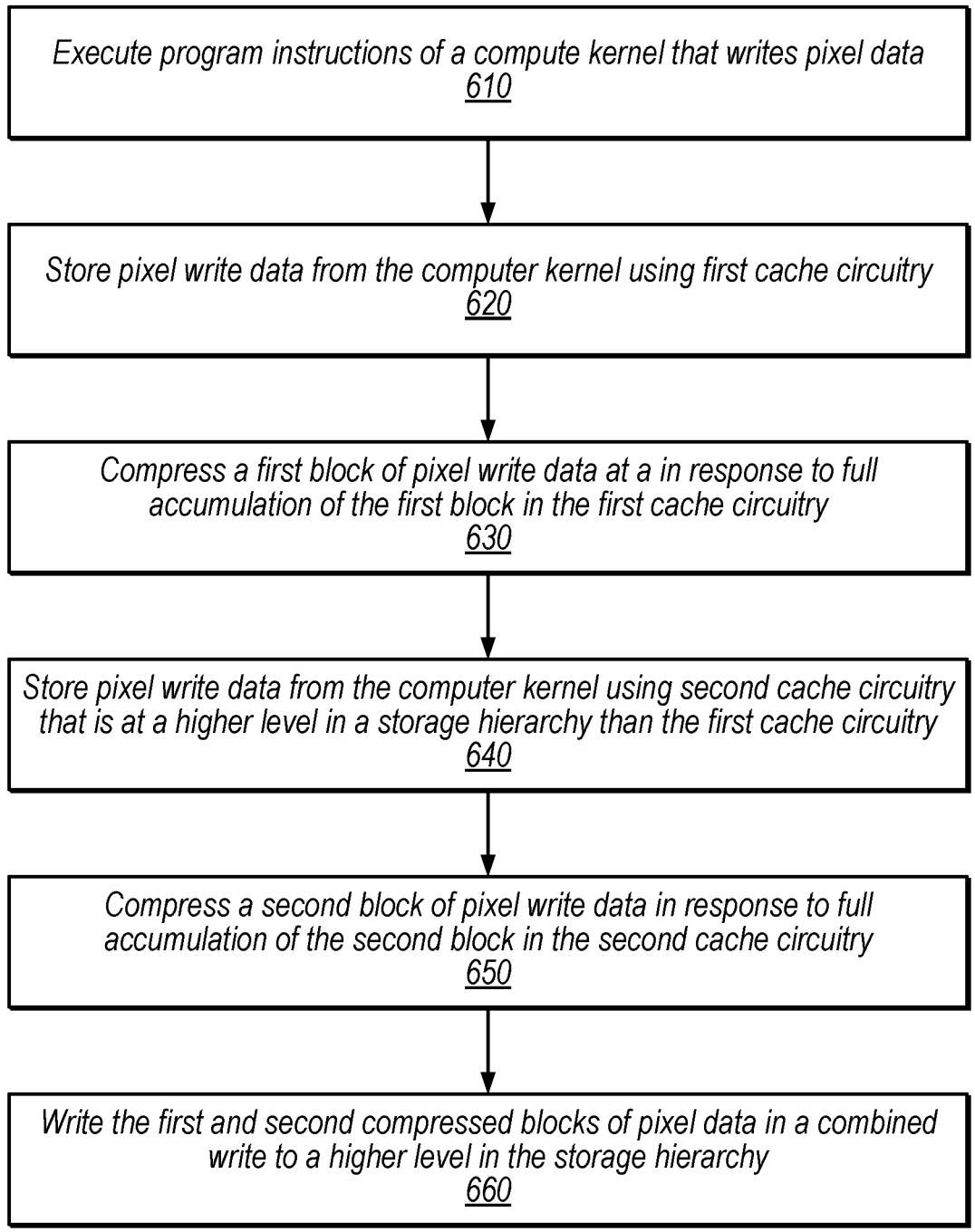
FIG. 6 is a flow diagram illustrating an example method for compression at multiple cache levels, according to some embodiments.

FIG. 6 is a flow diagram illustrating an example method for compression at multiple cache levels, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, programmable shader circuitry executes program instructions of a compute kernel that writes pixel data.

At 620, in the illustrated embodiment, first cache circuitry stores pixel write data from the computer kernel.

At 630, in the illustrated embodiment, first compression circuitry compresses a first block of pixel write data in response to full accumulation of the first block in the first cache circuitry. In some embodiments, for a type of write by the programmable shader circuitry that includes complete data for a threshold number of blocks (e.g., a macro-block compressible write) the device is configured to send multiple blocks of pixel write data to the pixel write circuitry without storing them in the first cache circuitry.

At 640, in the illustrated embodiment, second cache circuitry stores pixel write data from the computer kernel, where the second cache circuitry is at a higher level in a storage hierarchy than the first cache circuitry. In some embodiments, the device stores metadata in the second cache circuitry for the first and second blocks, where the metadata indicates whether the first and second blocks have been compressed by the first compression circuitry.

At 650, in the illustrated embodiment, second compression circuitry compresses a second block of pixel write data in response to full accumulation of the second block in the second cache circuitry. Note that the second block may not have been fully accumulated in the first cache circuitry, for example, but may be fully accumulated in the second cache circuitry due to its larger size.

In some embodiments, the devices includes tracking circuitry (e.g., macro-block scoreboard 312) that tracks respective accumulation status of a number of blocks of pixel write data. In some embodiments, in response to an eviction from the second caching circuitry of a third block of pixel write data that is not fully accumulated, the device in response to determining that corresponding data for the third block is not stored at a higher level in the storage hierarchy, inserts fill data for missing pixels and compresses the filled third block. Further, in response to determining that corresponding data for the third block is stored at a higher level in the storage hierarchy, the device may read the corresponding data, combine the read data with pixel write data for the third block, and compress the combined third block. Further, if the read data is compressed, decompressor circuitry may decompress the read data in response to determining that corresponding data for the third block is stored at a higher level in the storage hierarchy in a compressed format.

At 660, in the illustrated embodiment, write circuitry writes the first and second compressed blocks of pixel data in a combined write to a higher level in the storage hierarchy. The combined write may store pixel data for a graphics workgroup operating on a tile of a graphics frame and the first and second blocks may include pixel data for different portions of the tile.

In various embodiments, the disclosed techniques may advantageously reduce memory bandwidth by compressing data before writes to memory and may also reduce the footprint of pixel data in memory. This may improve performance or reduce power consumption relative to traditional techniques. Further, the disclosed multi-level compression techniques may improve compression performance, improve compression ratios, etc. while maintaining proper pixel data for pixels written at different times.

Example Device

Figure 7:
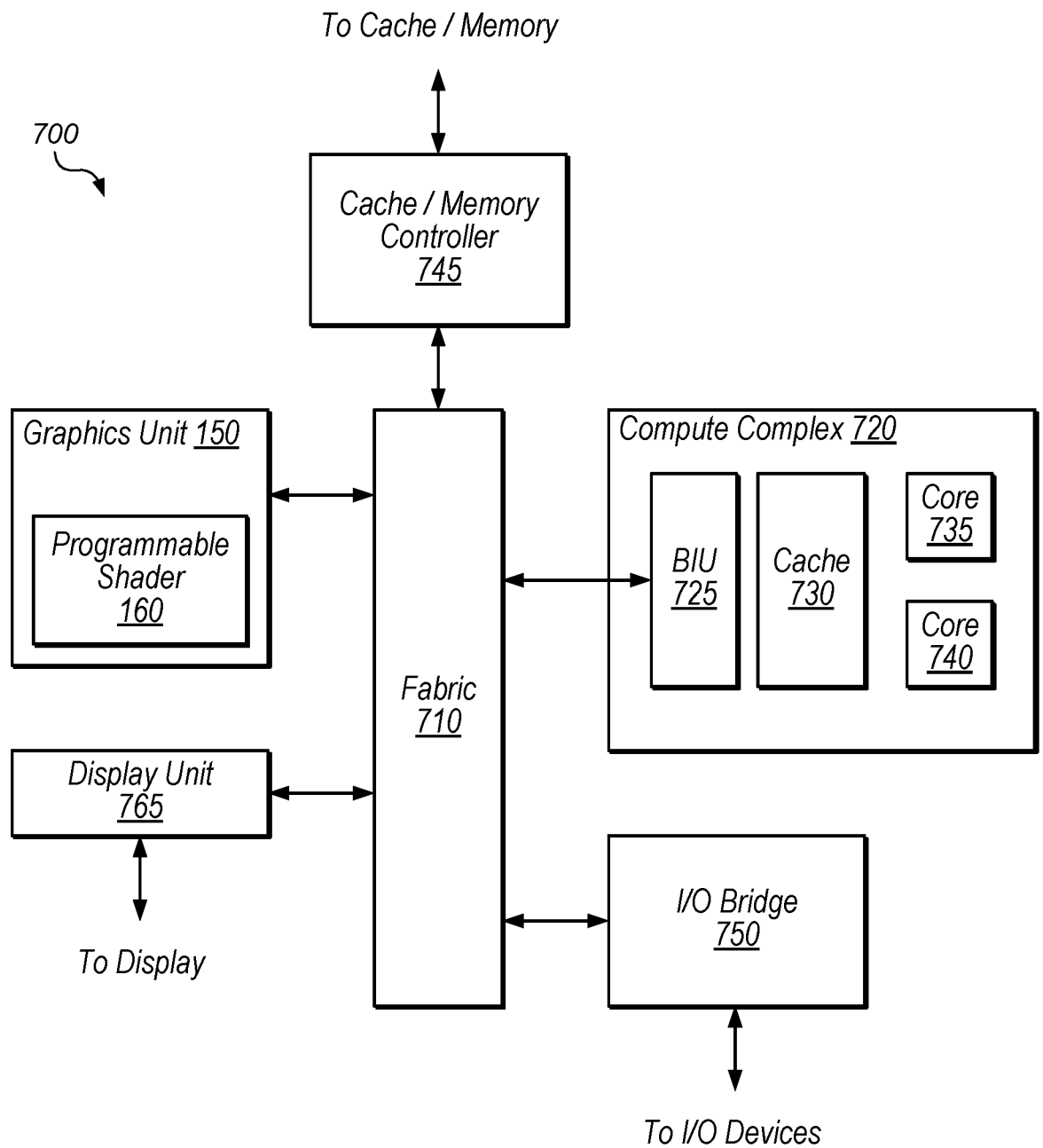
FIG. 7 is a block diagram illustrating an example computing device that includes a graphics processor, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 150, and display unit 765. In some embodiments, device 700 may include other components (not shown) in addition to and/or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. Programmable shader 160, in various embodiments, may include highly parallel execution cores configured to execute graphics programs, which may include pixel tasks, vertex tasks, and compute tasks (which may or may not be graphics-related).

In some embodiments, programmable shader 160 includes disclosed caching and compression circuitry.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
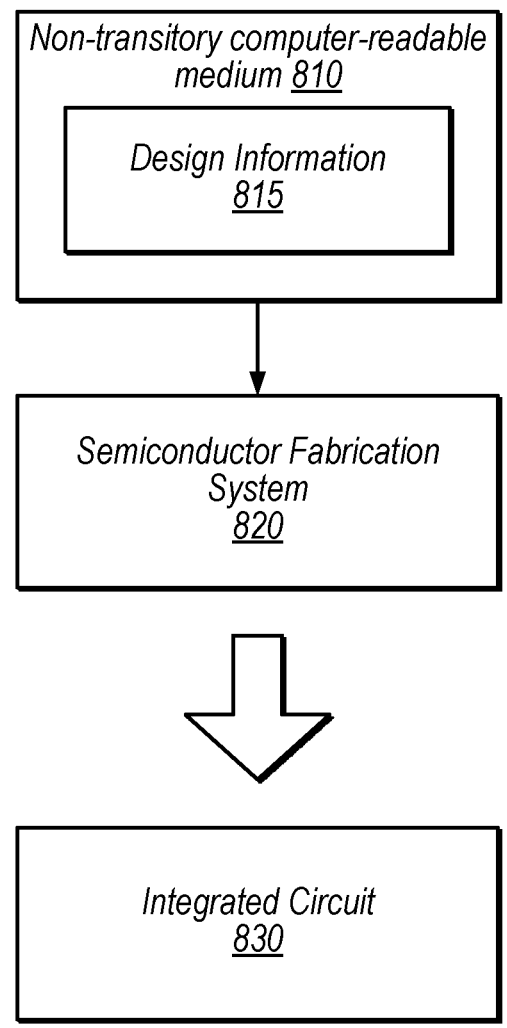
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1A-3 or 7. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a memory system with a storage hierarchy that includes first cache circuitry and second cache circuitry at different levels of the hierarchy;
   processor circuitry configured to generate write data to be written to the memory system;
   first compression circuitry configured to compress a first block of write data in response to full accumulation of the first block in the first cache circuitry;
   second compression circuitry configured to compress a second block of write data in response to full accumulation of the second block in the second cache circuitry, wherein the second block of write data and the first block of write data have the same block size prior to compression and wherein portions of the second block of write data were stored in the first cache circuitry but the second block of write data was not fully accumulated in the first cache circuitry prior to compression; and
   write circuitry configured to write the first and second compressed blocks of data in a single combined write to a higher level in the storage hierarchy.

2. The apparatus of claim 1, wherein the processor circuitry includes one or more graphics shader processors and the write data is pixel write data.

3. The apparatus of claim 2, wherein the combined write stores pixel data for a graphics workgroup operating on a tile of a graphics frame and wherein the first and second blocks include pixel data corresponding to different portions of the tile.

4. The apparatus of claim 1, further comprising:
   bypass circuitry configured to send multiple blocks of write data to the first compression circuitry without storing the multiple blocks in the first cache circuitry in response to detecting a type of write by the processor circuitry that includes complete data for a threshold number of blocks.

5. The apparatus of claim 1, further comprising:
   control circuitry configured to store metadata in the second cache circuitry, wherein the metadata indicates whether blocks were compressed by the first compression circuitry.

6. The apparatus of claim 1, further comprising:
tracking circuitry configured to track respective accumulation status of multiple blocks of write data;
wherein, in response to an eviction from the second cache circuitry of a third block of write data that is not fully accumulated, the apparatus is configured to:
in response to determining that corresponding data for the third block is not stored at a higher level in the storage hierarchy, insert fill data for missing data and compress the filled third block; and
in response to determining that corresponding data for the third block is stored at another level in the storage hierarchy, read the corresponding data from the other level, combine the read data with write data for the third block, and compress the combined third block.

7. The apparatus of claim 6, further comprising:
decompressor circuitry configured to decompress the read data, in response to determining that corresponding data for the third block is stored at the other level in the storage hierarchy in a compressed format.

8. The apparatus of claim 1, wherein the first compression circuitry is configured to use a different compression algorithm to compress the first block than the second compression circuitry is configured to use to compress the second block.

9. A method, comprising:
generating, by processor circuitry, write data to be written to a memory system, wherein the memory system implements a storage hierarchy that includes first cache circuitry and second cache circuitry at different levels of the hierarchy;
compressing, by first compression circuitry, a first block of write data in response to full accumulation of the first block in the first cache circuitry;
compressing, by second compression circuitry, a second block of write data in response to full accumulation of the second block in the second cache circuitry, wherein the second block of write data and the first block of write data have the same block size prior to compression and wherein portions of the second block of write data were stored in the first cache circuitry but the second block of write data was not fully accumulated in the first cache circuitry prior to compression; and
writing, by write circuitry, the first and second compressed blocks of data in a single combined write to a higher level in the storage hierarchy.

10. The method of claim 9, wherein the write data is pixel write data.

11. The method of claim 9, further comprising:
sending, using bypass circuitry, multiple blocks of write data to the first compression circuitry without storing the multiple blocks in the first cache circuitry in response to detecting a type of write by the processor circuitry that includes complete data for a threshold number of blocks.

12. The method of claim 9, further comprising:
storing, by control circuitry, metadata in the second cache circuitry, wherein the metadata indicates whether blocks were compressed by the first compression circuitry.

13. The method of claim 9, further comprising:
tracking, by tracking circuitry, respective accumulation status of multiple blocks of write data; and
in response to an eviction from the second cache circuitry of a third block of write data that is not fully accumulated and in response to determining that corresponding data for the third block is stored at another level in the storage hierarchy, control circuitry:
reading the corresponding data from the other level;
combining the read data with write data for the third block; and
compressing the combined third block.

14. The method of claim 9, wherein the first compression circuitry uses a different compression algorithm to compress the first block than the second compression circuitry uses to compress the second block.

15. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
a memory system with a storage hierarchy that includes first cache circuitry and second cache circuitry at different levels of the hierarchy;
processor circuitry configured to generate write data to be written to the memory system;
first compression circuitry configured to compress a first block of write data in response to full accumulation of the first block in the first cache circuitry;
second compression circuitry configured to compress a second block of write data in response to full accumulation of the second block in the second cache circuitry, wherein the second block of write data and the first block of write data have the same block size prior to compression and wherein portions of the second block of write data were stored in the first cache circuitry but the second block of write data was not fully accumulated in the first cache circuitry prior to compression; and
write circuitry configured to write the first and second compressed blocks of data in a single combined write to a higher level in the storage hierarchy.

16. The non-transitory computer readable storage medium of claim 15, wherein the processor circuitry includes one or more graphics shader processors and the write data is pixel write data.

17. The non-transitory computer readable storage medium of claim 15, wherein the circuit further includes:
bypass circuitry configured to send multiple blocks of write data to the first compression circuitry without storing the multiple blocks in the first cache circuitry in response to detecting a type of write by the processor circuitry that includes complete data for a threshold number of blocks.

18. The non-transitory computer readable storage medium of claim 15, wherein the circuitry further includes:
control circuitry configured to store metadata in the second cache circuitry, wherein the metadata indicates whether blocks were compressed by the first compression circuitry.

19. The non-transitory computer readable storage medium of claim 15, wherein the circuitry further includes:
tracking circuitry configured to track respective accumulation status of multiple blocks of write data;
wherein, in response to an eviction from the second cache circuitry of a third block of write data that is not fully accumulated, the circuit is configured to:
in response to determining that corresponding data for the third block is not stored at a higher level in the storage hierarchy, insert fill data for missing data and compress the filled third block; and in response to determining that corresponding data for the third block is stored at another level in the storage hierarchy, read the corresponding data from the other level, combine the read data with write data for the third block, and compress the combined third block.

20. The non-transitory computer readable storage medium of claim 15, wherein the first compression circuitry is configured to use a different compression algorithm to compress the first block than the second compression circuitry is configured to use to compress the second block.

* * * * *